(12) United States Patent
Wu (10) Patent No.: US 12,487,469 B2
(45) Date of Patent: Dec. 2, 2025

(54) OPTICAL FILM, OPTICAL MODULE, AND ELECTRONIC DEVICE (71) Applicant: VIVO MOBILE COMMUNICATION CO., LTD., Guangdong (CN)

(72) Inventor: Huaping Wu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 356 days.

(21) Appl. No.: 18/344,627

(22) Filed: Jun. 29, 2023

(65) Prior Publication Data

US 2023/0341700 A1 Oct. 26, 2023

Related U.S. Application Data (63) Continuation of application No. PCT/CN2021/142322, filed on Dec. 29, 2021.

(30) Foreign Application Priority Data

Dec. 31, 2020 (CN) .......................... 202011637061.0

(51) Int. Cl.
G02B 27/30 (2006.01)
G02B 19/00 (2006.01)

(52) U.S. Cl.
CPC .......... *G02B 27/30* (2013.01); *G02B 19/0009* (2013.01)

(58) Field of Classification Search
CPC .. G02B 27/30; G02B 19/0009; G02B 5/3083; G02B 3/0056; G02B 3/0037; G06F 21/32; G06F 3/042; G06V 40/1318
See application file for complete search history.

(56) References Cited

U.S. PATENT DOCUMENTS

| | | |
|---|---|---|
| 2003/0072080 A1 | 4/2003 | Ariyoshi et al. |
| 2004/0051945 A1 | 3/2004 | Adachi |

(Continued)

FOREIGN PATENT DOCUMENTS

| | | |
|---|---|---|
| CN | 108460349 A | 8/2018 |
| CN | 208848221 U | 5/2019 |

(Continued)

OTHER PUBLICATIONS

Extended European Search Report for Application No. 21914462.3, dated May 23, 2024, 10 Pages.

(Continued)

*Primary Examiner* — James C. Jones
(74) *Attorney, Agent, or Firm* — BROOKS KUSHMAN P.C.

(57) ABSTRACT

An optical film, an optical module, and an electronic device are provided, which belong to the technical field of communication devices. The optical film includes a base body and a plurality of light-condensing protrusions. The plurality of light-condensing protrusions form a first array group on a first surface of the base body, and the first array group has a first arrangement direction and a second arrangement direction. The base body has a first optical axis. The first optical axis is perpendicular to a first direction. The first arrangement direction is parallel to the first direction. A first preset included angle is formed between the second arrangement direction and the first arrangement direction. The base body is an anisotropic structure, and the first direction is a direction corresponding to the anisotropic structure.

20 Claims, 6 Drawing Sheets

(56) References Cited

U.S. PATENT DOCUMENTS

| | | |
|---|---|---|
| 2006/0061869 A1 | 3/2006 | Fadel |
| 2018/0239941 A1 | 8/2018 | Mackey et al. |
| 2019/0179488 A1 | 6/2019 | Klenkler et al. |
| 2020/0327296 A1 | 10/2020 | Wu et al. |
| 2023/0341700 A1* | 10/2023 | Wu ...................... G02B 3/0056 |

FOREIGN PATENT DOCUMENTS

| | | |
|---|---|---|
| CN | 110323238 A | 10/2019 |
| CN | 210295120 U | 4/2020 |
| CN | 211236934 U | 8/2020 |
| CN | 111611952 A | 9/2020 |
| CN | 111788577 A | 10/2020 |
| CN | 211956495 U | 11/2020 |
| CN | 112036228 A | 12/2020 |
| CN | 112698432 A | 4/2021 |
| JP | 2000028807 A | 1/2000 |
| JP | 2003121609 A | 4/2003 |
| JP | 2009008832 A | 1/2009 |
| JP | 2009020161 A | 1/2009 |
| JP | 2013076881 A | 4/2013 |

OTHER PUBLICATIONS

Advanced Fabrication Technologies for Micro/Nano Optics and Photonics VII "Manufacturing Technique of Large-Area Optical Elements with Micro/Nano Structures on Both Surfaces" Toshimitsu Takaoka, et. al., Japan, 2014, 7 Pages.
First Office Action for Japanese Application No. 2023-540630, dated May 7, 2024, 5 Pages.
International Search Report and Written Opinion for Application No. PCT /CN2021/142322, dated Mar. 17, 2022, 9 Pages.

* cited by examiner

FIG. 13

OPTICAL FILM, OPTICAL MODULE, AND ELECTRONIC DEVICE

CROSS-REFERENCE TO RELATED APPLICATIONS

This application is a continuation of International Application No. PCT/CN2021/142322, filed on Dec. 29, 2021, which claims priority to Chinese Patent Application No. 202011637061.0, filed on Dec. 31, 2020, which are incorporated herein by reference in their entireties.

TECHNICAL FIELD

This application belongs to the technical field of communication devices, and specifically relates to an optical film, an optical module, and an electronic device.

BACKGROUND

Application of electronic devices is becoming wider as the electronic devices develop rapidly. Electronic devices such as mobile phones and tablet computers provide increasing functions in work, life, entertainment, and the like of people. An optical module of an electronic device mainly includes a fingerprint module and a camera module. The fingerprint module implements a fingerprint identification function of the electronic device, and the camera module mainly implements a photographing function of the electronic device.

The fingerprint module is exemplified for description. In the related art, an electronic device includes a fingerprint module and a display module. The fingerprint module is located below the display module, and the display module emits light. After light is refracted by a finger of a user, a part of the light enters the fingerprint module, thereby realizing identification of a fingerprint of the user. In order to improve the optical performance of the fingerprint module, an optical film such as a microlens film may be attached to a photosensitive chip of the fingerprint module. The microlens film can transform scattered light into parallel light, thereby improving the optical performance of the fingerprint module.

During implementation of the present invention, the inventors found the following problems in the related art: Due to a non-uniform structure of an optical film material, light propagates in a plurality of directions when entering the optical film material, and the propagation path varies with the film material structure. As a result, a part of the light is lost or interferes with the light in other propagation directions, and the light transmission quality of the optical module is poor, which affects the imaging of the fingerprint module.

SUMMARY

In a first aspect, an embodiment of this application provides an optical film, including a base body and a plurality of light-condensing protrusions. The plurality of light-condensing protrusions form a first array group on a first surface of the base body, and the first array group has a first arrangement direction and a second arrangement direction.

The base body has a first optical axis, the first optical axis is perpendicular to a first direction, the first arrangement direction is parallel to the first direction, and a first preset included angle is formed between the second arrangement direction and the first arrangement direction.

The base body is an anisotropic structure, and the first direction is a direction corresponding to the anisotropic structure.

In a second aspect, an embodiment of this application provides an optical module, including a photosensitive unit and the above optical film. The optical film covers a photosensitive surface of the photosensitive unit.

In a third aspect, an embodiment of this application provides an electronic device, including a housing, a display module, and the above optical module. The housing and the display module define an accommodating cavity, and the optical module is located in the accommodating cavity and distributed opposite to the display module.

REFERENCE NUMERALS

100—Optical film, 110—Base body, 111—First optical axis, 112—First direction, 120—Light-condensing protrusion, 121—First arrangement direction, 122—First line of centers, 123—Second arrangement direction, 124—Second line of centers, 125—First axis of symmetry, 126—First spacing, 130—Light-shielding layer, 131—Collimating hole, 200—Display module, 210—Pixel unit, 211—Second axis of symmetry, 212—Second spacing, 300—Photosensitive unit.

DETAILED DESCRIPTION

The technical solutions in the embodiments of this application are clearly and completely described below with reference to the drawings in the embodiments of this application. Apparently, the described embodiments are merely some of the embodiments of this application rather than all of the embodiments. All other embodiments obtained by a person of ordinary skill in the art based on the embodiments of this application without creative efforts shall fall within the protection scope of this application.

The terms "first", "second", and the like in the description and claims of this application are used to distinguish between similar objects, rather than describe a specific sequence or order. It should be understood that the data used in this case may be transposed where appropriate, so that the embodiments of this application can be implemented in a sequence other than those illustrated or described herein. In addition, "and/or" in the description and claims indicates at least one of the connected objects, and the character "/" generally indicates that the associated objects at front and rear are in an "or" relationship.

An optical film provided in the embodiments of this application is described below in detail through specific embodiments and application scenarios with reference to the drawings.

Referring to FIG. 1 to FIG. 13, the embodiments of this application disclose an optical film 100. The disclosed optical film 100 includes a base body 110 and a plurality of light-condensing protrusions 120.

Figure 1:
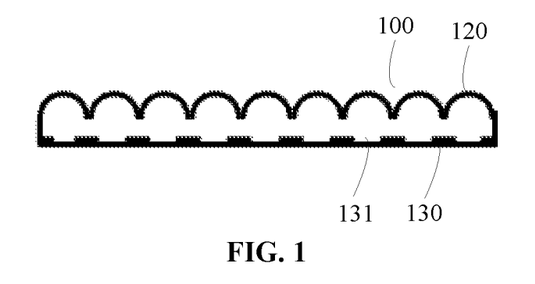
FIG. 1 is a structural diagram of an optical film according to an embodiment of this application.
Figure 2:
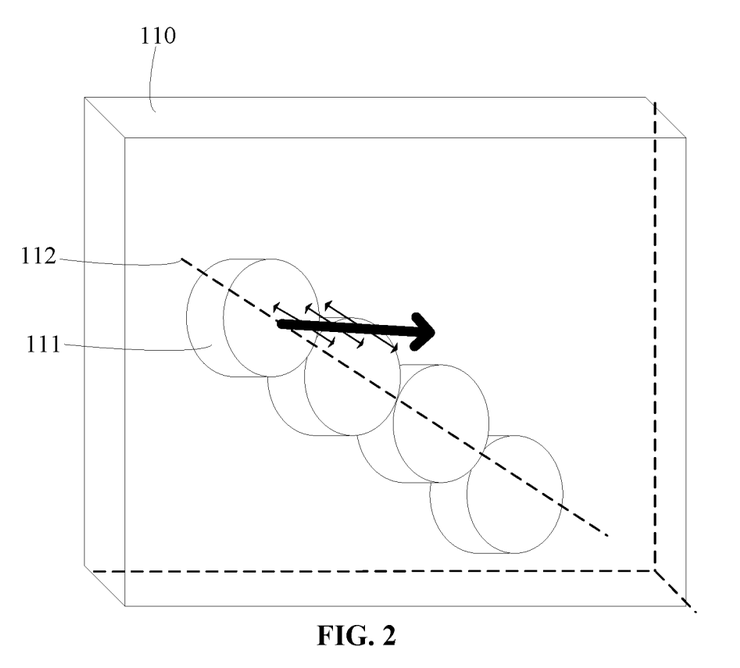
FIG. 2 and FIG. 3 are structural diagrams of a base body of the optical film according to an embodiment of this application.

The plurality of light-condensing protrusions 120 form a first array group on a first surface of the base body 110, and the first array group has a first arrangement direction 121 and a second arrangement direction 123. Optionally, the base body 110 may be made of a polyethylene terephthalate (PET) material, or may be made of other materials. This is not limited herein. The light-condensing protrusions 120 can refract light passing through the optical film 100, thereby changing a propagation path of the light to achieve light collimation.

The base body 110 has a first optical axis 111, and the first optical axis 111 is perpendicular to the base body 110. Therefore, the first optical axis is a main optical axis of the base body 110. The first optical axis 111 is perpendicular to a first direction 112, the first arrangement direction 121 is parallel to the first direction 112, and a first preset included angle is formed between the second arrangement direction 123 and the first arrangement direction 121.

The base body 110 is an anisotropic structure, and the first direction 112 is a direction corresponding to the anisotropic structure. It may be understood that when the base body 110 is biaxially stretched, lattices within the base body 110 are stretched by the force applied to the base body 110. At this time, the anisotropic lattice structure of the base body correspondingly has a specific direction with the smallest birefringence. The direction is the first direction in the above, which may also be referred to as a direction of an optical axial angle of the base body 110. The plurality of light-condensing protrusions 120 are arranged in the specific direction, thereby reducing light losses and interference caused by the birefringence effect, and improving the light utilization rate of the optical film 100.

In an understanding way, the first optical axis in the base body 110 is the main optical axis of the base body 110, and the first optical axis is perpendicular to the base body, that is, the first optical axis is perpendicular to the first direction. The first direction is mainly related to stretching of the base body 110 by a force, which depends on a polarization direction of crystal during the stretching of the base body 110 by a force.

Optionally, the first direction 112 may be measured through light polarization or a birefringence effect. For example, a polarizer is used to measure polarized light of the base body 110. Since a direction of the polarized light is parallel to the direction of the optical axial angle, the direction of the polarized light is the first direction 112. The first preset included angle in the above may be 30°, 45°, or 90°, or may be other values. This is not limited herein.

Figure 13:
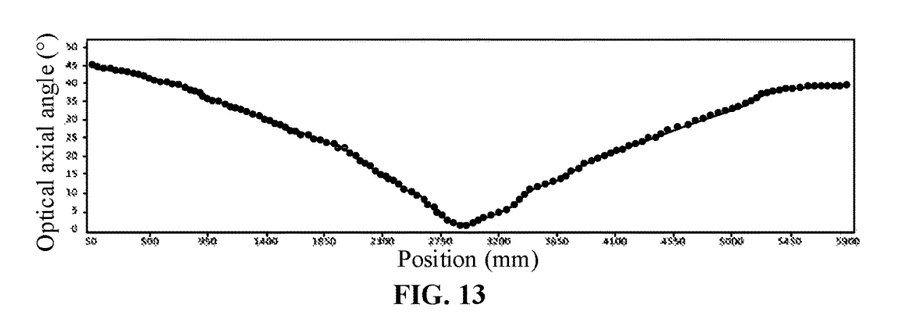
FIG. 13 is a schematic diagram of a length versus an optical axial angle of a film material used to make the base body in the optical film according to an embodiment of this application.

A relationship between an optical axial angle of a film material for manufacturing the base body 110 and a position of the film material after biaxial stretching of the film material is shown in FIG. 13. A total length of the film material after the stretching may be 5900 mm. After the stretching of the film material, the optical axial angle varies at each position. Therefore, a corresponding optical axial angle in each segment varies. For example, between 50 mm and 500 mm, the optical axial angle of the film material is closer to 45°, and therefore the light-condensing protrusions 120 are arranged in a direction of the optical axial angle of 45°. Between 950 mm and 1400, the optical axial angle of the film material is closer to 30°, and therefore the light-condensing protrusions 120 are arranged in a direction of the optical axial angle of 30°. Therefore, the light-condensing protrusions are arranged according to the optical axial angle corresponding to each segment of the film material.

Figure 3:
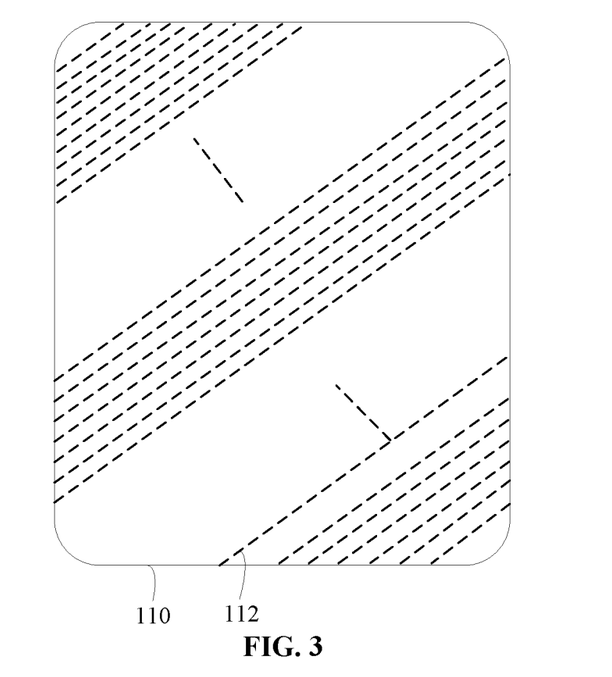
Figure 4:
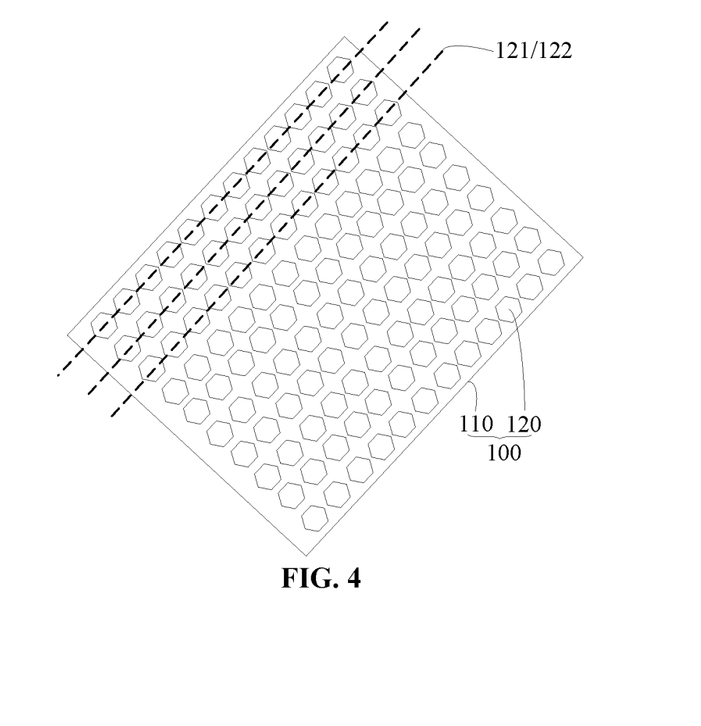
FIG. 4 to FIG. 6 are schematic diagrams of arrangement of light-condensing protrusions on the base body in the optical film according to an embodiment of this application.
Figure 5:
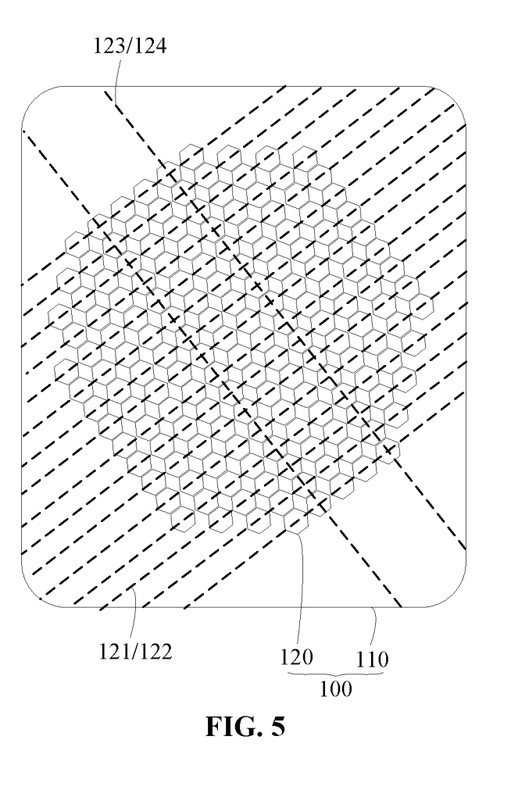
Figure 6:
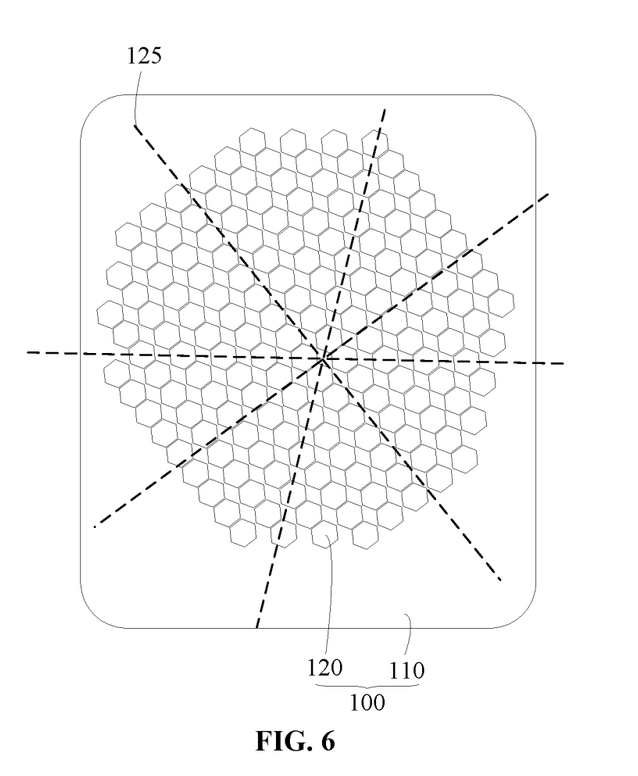
Figure 7:
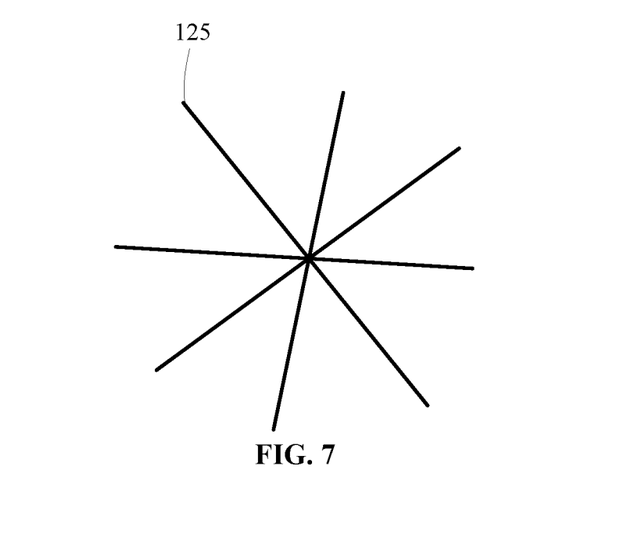
FIG. 7 is a schematic diagram of distribution of first axis of symmetry in the optical film according to an embodiment of this application.
Figure 8:
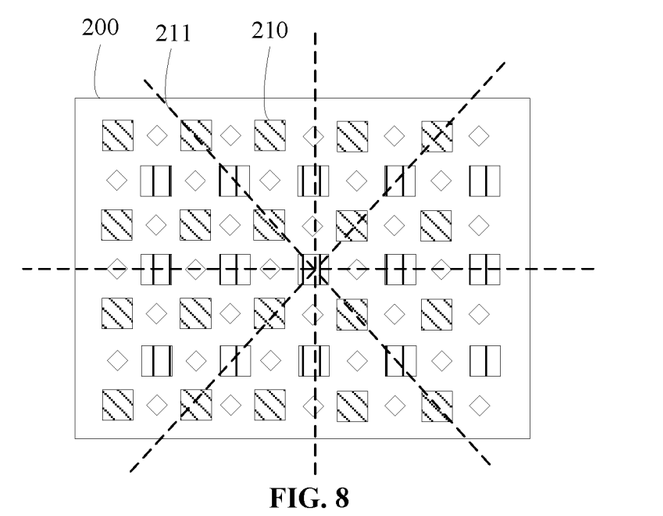
FIG. 8 is a schematic diagram of arrangement of pixel units on a display module in an electronic device according to an embodiment of this application.
Figure 9:
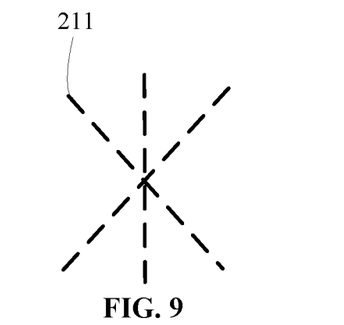
FIG. 9 is a schematic diagram of distribution of second axes of symmetry of the display module in the electronic device according to an embodiment of this application.
Figure 10:
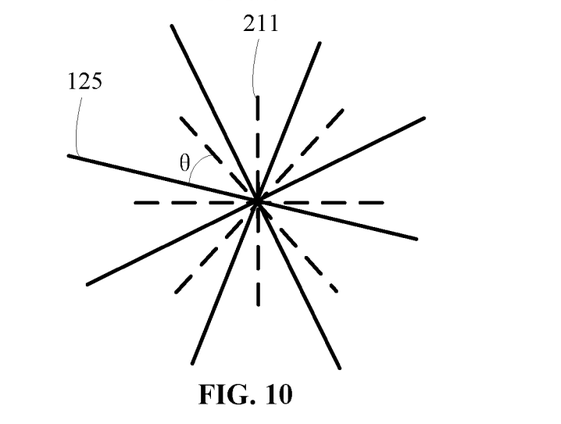
FIG. 10 is a schematic diagram of distribution of the first axes of symmetry and second axes of symmetry in the electronic device according to an embodiment of this application.

As shown in FIG. 3, an included angle between the first direction 112 and one side edge of the base body 110 may be 45°, or may be other angles. The included angle between the first direction 112 and the side edge of the base body 110 depends on a specific shape of the base body 110.

In the embodiments of this application, the arrangement direction of plurality of light-condensing protrusions 120 is parallel to the first direction 112, so that the light passing through the light-condensing protrusions 120 can be polarized in the first direction 112, thereby enabling the light to propagate in the direction of the optical axis of the base body 110 as far as possible, which reduces the birefringence effect and improves the optical characteristics and light transmission quality of the optical module.

Since the base body 110 is the anisotropic structure, the base body may have optical axes in other directions. However, the light from the light-condensing protrusions 120 follow the first direction 112, the light is unlikely to propagate along other optical axes, thereby reducing the birefringence effect of the base body 110.

In the above embodiment, due to factors such as a control precision and an instrument tolerance during the manufacturing of the optical film 100, a deviation of ±5° is allowed for the first direction 112 and the first arrangement direction 121.

In order to further reduce the birefringence effect of the optical film 100, in another optional embodiment, the first arrangement direction 121 and the second arrangement direction 123 are perpendicular to each other. In the solution, polarization directions of the polarized light in the first arrangement direction 121 and the polarized light in the second direction are the same, thereby further reducing the birefringence effect.

In another optional embodiment, a second surface of the base body 110 is provided with a light-shielding layer 130, the light-shielding layer 130 is provided with a plurality of collimating holes 131, and each of the light-condensing protrusions 120 corresponds to one of the collimating holes 131. The light-shielding layer 130 can prevent large angle light from passing through the optical film 100, thereby improving the optical performance of the optical film 100.

Further, in the first arrangement direction 121, a line of centers between adjacent light-condensing protrusions 120 is a first line of centers 122, and the first line of centers 122 is an axis of symmetry of the light-condensing protrusions 120 and the collimating holes. In other words, the line of centers of the light-condensing protrusions 120 arranged in the first arrangement direction 121 is parallel to the first direction 112, so that centers of the light-condensing protrusions 120 coincide with a center of the first optical axis 111, thereby enabling the light to propagate in the direction of the first optical axis 111 as far as possible, which further reduces the birefringence effect.

In another optional embodiment, in the second arrangement direction 123, a line of centers between adjacent light-condensing protrusions 120 is a second line of centers 124, and the second line of centers 124 is an axis of symmetry of the light-condensing protrusions 120 and the collimating holes 131. The solution can further reduce the birefringence effect.

In the above embodiment, in the vertical direction of the base body 110, a projection profile of the light-condensing protrusion 120 may be central symmetric figures such as a circle, a regular quadrangle, or a regular hexagon, thereby enabling the light-condensing protrusion 120 to be symmetrical in both the first arrangement direction and the second arrangement direction 123, which further improves the optical effect of the optical film 100.

In another optional embodiment, the projection of the light-condensing protrusion 120 in the vertical direction of the base body 110 may be a regular hexagon. In the solution, the regular hexagon has a large reflective surface area, so the collimation effect of the optical film 100 can be improved.

In the above embodiment, a display module 200 of an electronic device may cover the optical film 100, the display module 200 may have a plurality of pixel units 210, and the pixel units 210 may be arranged in an array to form a second array group. Since light presents grid-shaped interference fringes after passing through the display module 200 and the optical film 100, the imaging effect of the optical module is affected.

In another optional embodiment, the first array group may have a plurality of first axes of symmetry 125, and the first array group may be symmetrical along each of the first axes of symmetry 125. The second array group may have a plurality of second axes of symmetry 211. The second array group may be symmetrically arranged along each of the second axes of symmetry 211. Each of the first axes of symmetry 125 coincides with none of the plurality of second axes of symmetry 211.

In this solution, the expression "the first axis of symmetry 125 coincides with none of the plurality of second axes of symmetry 211" means that the arrangement direction of the light-condensing protrusions 120 is staggered with the arrangement direction of the pixel points, and the arrangement direction of the light-condensing protrusions 120 is deviated from the arrangement direction of the pixel points by a specific angle. Therefore, the light-condensing protrusions 120 and the pixel units 210 are unlikely to coincide, and therefore the pixel units 210 and the light-condensing protrusions 120 are unlikely to form interference fringes, so that a clear image is formed.

Figure 11:
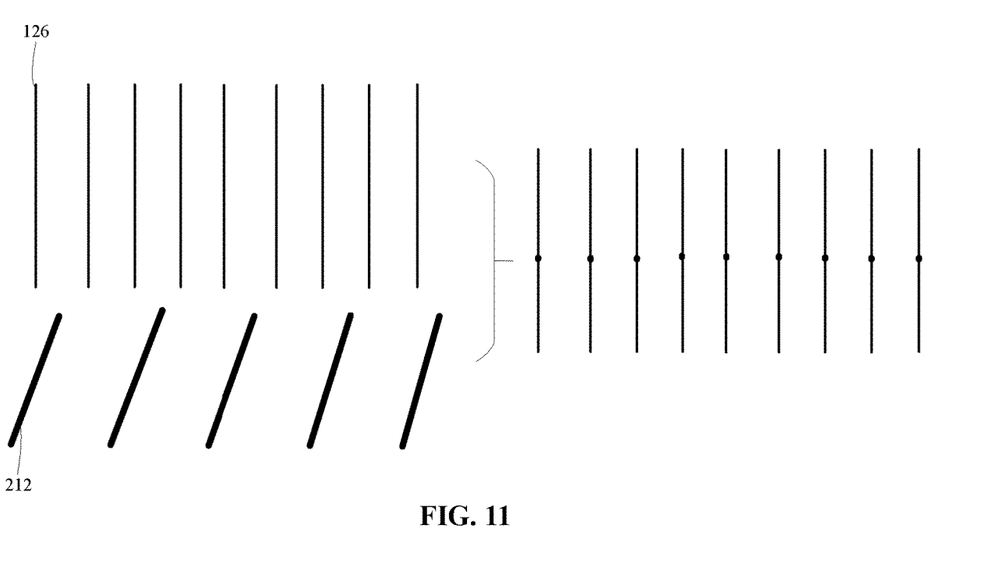
FIG. 11 is a schematic diagram of distribution of first spacings and second spacings in the electronic device according to an embodiment of this application.

As shown in FIG. 11, since the first axis of symmetry 125 coincides with none of the plurality of second axes of symmetry 211, only discrete interference points are formed at a part, which has small impact on the imaging of the optical module.

Optionally, the included angle between two adjacent first axes of symmetry 125 is 45°. In this case, a large staggering space is reserved between two adjacent first axes of symmetry 125, thereby further preventing the pixel units 210 and the light-condensing protrusions 120 from forming interference fringes.

Further, an included angle between two adjacent second axes of symmetry 211 may be 45°. In this case, a large staggering space is reserved between two adjacent second axes of symmetry 211, thereby further preventing the pixel units 210 and the light-condensing protrusions 120 from forming interference fringes.

Further, an included angle $\theta$ between adjacent first axis of symmetry 125 and second axis of symmetry 211 may be in a range of 0°<$\theta$<45°. In this case, it can be ensured that the pixel units 210 and the light-condensing protrusions 120 can be staggered from each other in each arrangement direction.

Optionally, the included angle $\theta$ between the first axis of symmetry 125 and the second axis of symmetry 211 may be in a range of 12.5° to 32.5°, and preferably, may be 22.5°.

In another optional embodiment, a first spacing 126 may exist between adjacent light-condensing protrusions 120, and a region in the first spacing 126 has a low transmittance. A second spacing 212 may exist between adjacent pixel units 210, and a region in the second spacing 212 has a high transmittance. The first spacing 126 may be less than the second spacing 212, an absolute value of a difference between a multiple of the first spacing 126 and the second spacing 212 is greater than or equal to a first preset threshold, and the first preset threshold is a positive number. In this solution, since the second spacing 212 is not an integer multiple of the first spacing 126, parts with a low transmittance are unlikely to overlap each other, so that interference fringes are unlikely to occur.

In another optional embodiment, the optical film 100 disclosed in this application may further include a light-shielding layer 130. The light-shielding layer 130 is provided with a plurality of light-transmitting holes, the light-shielding layer 130 may be arranged on the second surface of the base body 110 facing away from the display module 200, the plurality of light-condensing protrusions 120 may be located on the first surface of the base body 110 facing the display module 200, and the plurality of light-transmitting holes and the plurality of light-condensing protrusions 120 are distributed in a one-to-one correspondence. That is to say, the light first passes through the light-condensing protrusions 120, and then passes through the light-transmitting holes. In the process, the light-condensing protrusions 120 may first condense light, thereby increasing a light passing amount of each light-transmitting hole.

An area of the light-transmitting hole may be a first area, and a spacing between two adjacent light-transmitting holes is a third spacing. The light-transmitting holes are areas on the optical film 100 with a high light transmittance, and an area in the third spacing has a low light transmittance. An area of each of the pixel units 210 is a second area, and a spacing between two adjacent pixel units 210 is a fourth spacing. The pixel points are areas on the display module 200 with a low light transmittance, and an area in the fourth spacing has a high light transmittance. The first area may be less than the second area, and the third spacing may be less than the fourth spacing.

The second area is not a multiple of the first area, and/or the fourth spacing is not a multiple of the third spacing. In this solution, since the second area is not a multiple of first area, parts with a low transmittance are unlikely to overlap each other, so that interference fringes are unlikely to occur. The same effect can be achieved when the fourth spacing is not a multiple of the third spacing. The details are not described herein.

The light-transmitting hole and the collimating hole in the above have the same structure, although their names are different in different embodiments. An area of the collimating hole 131 is less than or equal to an area of the light-condensing protrusion 120, so that the light-condensing protrusion 120 can completely cover the collimating hole 131.

Based on the optical film 100 disclosed in the embodiments of this application, the embodiments of this application further disclose an optical module. The disclosed optical module includes the optical film 100 described in any of the above embodiments. The optical module disclosed in the embodiments of this application may further include a photosensitive unit 300, and the optical film 100 covers a photosensitive surface of the photosensitive unit 300. In this case, light passes through the optical film 100 and is then incident onto the photosensitive unit 300.

In this solution, the arrangement direction of plurality of light-condensing protrusions 120 is parallel to the first direction 112, so that the light passing through the light-condensing protrusions 120 can be polarized in the first direction 112, thereby enabling the light to propagate along the first optical axis 111 of the base body 110, which reduces the birefringence effect and improves the safety and light transmission quality of the optical module.

Optionally, the optical module may include at least one of a fingerprint identification module and a camera module.

Based on the optical module disclosed in the embodiments of this application, the embodiments of this application further disclose an electronic device. The disclosed electronic device includes the optical module described in any of the above embodiments. The electronic device disclosed in the embodiments of this application may further include a housing and a display module 200. The housing provides a mounting base for other components of the electronic device. The housing and the display module 200 may define an accommodating cavity, and the optical module may be located in the accommodating cavity and distributed opposite to the display module 200. In this case, the optical module may be located below the display module 200 to achieve functions such as off-screen fingerprint identification or off-screen photographing of the electronic device.

In this solution, light passes through the display module 200 and then enters the optical module, the arrangement direction of plurality of light-condensing protrusions 120 is parallel to the first direction 112, so that the light passing through the light-condensing protrusions 120 can be polarized in the first direction 112, thereby enabling the light to propagate along the first optical axis 111 of the base body 110, which reduces the birefringence effect and improves the safety and reliability of the optical module, thereby improving the fingerprint identification function of the electronic device or improving the photographing performance of the electronic device.

Figure 12:
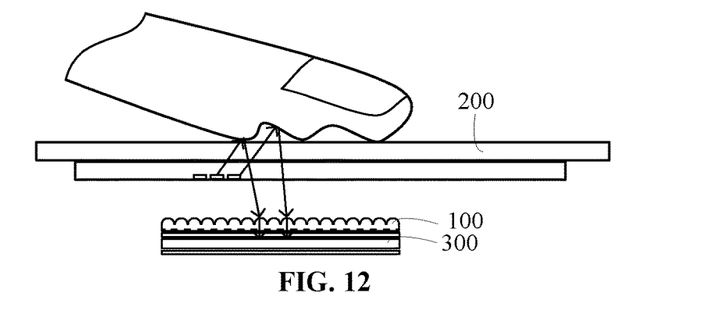
FIG. 12 is a schematic structural diagram of an electronic device according to an embodiment of this application.

As shown in FIG. 12, the optical module may be a fingerprint module. A light emitting unit of the display module 200 emits light, and the light is refracted by a finger of a user and transmitted through the display module 200, and then enters the optical module, to achieve fingerprint identification.

The electronic device disclosed in the embodiments of this application may be devices such as a smart watch, a smartphone, or a tablet computer. The specific type of the electronic device is not limited in the embodiments of this application.

Although the embodiments of this application are described above with reference to the drawings, this application is not limited to the specific embodiments described above. The above specific embodiments are illustrative but not restrictive. With the enlightenment of this application, a person of ordinary skill in the art may make many forms without departing from the concept of this application and the protection scope of the claims. These forms fall within the protection of this application.

What is claimed is:

1. An optical film, comprising a base body and a plurality of light-condensing protrusions, wherein the plurality of light-condensing protrusions form a first array group on a first surface of the base body, and the first array group has a first arrangement direction and a second arrangement direction;
   the base body has a first optical axis, the first optical axis is perpendicular to a first direction, the first arrangement direction is parallel to the first direction, and a first preset included angle is formed between the second arrangement direction and the first arrangement direction; and
   the base body is an anisotropic structure, and the first direction is a direction corresponding to the anisotropic structure.

2. The optical film according to claim 1, wherein the first arrangement direction is perpendicular to the second arrangement direction.

3. The optical film according to claim 1, wherein a second surface of the base body is provided with a light-shielding layer, the light-shielding layer is provided with a plurality of collimating holes, and each of the light-condensing protrusions corresponds to one of the collimating holes; and
   in the first arrangement direction, a line of centers between adjacent light-condensing protrusions is a first line of centers, and the first line of centers is an axis of symmetry of the light-condensing protrusions and the collimating holes.

4. The optical film according to claim 3, wherein a projection of the light-condensing protrusion is a regular hexagon in a vertical direction of the base body.

5. The optical film according to claim 3, wherein in the second arrangement direction, a line of centers between adjacent light-condensing protrusions is a second line of centers, and the second line of centers is an axis of symmetry of the light-condensing protrusions and the collimating holes.

6. The optical film according to claim 3, wherein an area of the collimating hole is less than or equal to an area of the light-condensing protrusion, and the light-condensing protrusion completely covers the collimating hole.

7. The optical film according to claim 1, wherein the first array group has a plurality of first axes of symmetry;
   a display module of an electronic device covers the optical film, the display module has a plurality of pixel units, the pixel units are arranged in an array to form a second array group, and the second array group has a plurality of second axes of symmetry; and
   each of the first axes of symmetry coincides with none of the plurality of second axes of symmetry.

8. The optical film according to claim 7, wherein an included angle between two adjacent first axes of symmetry is 45°; and/or
   an included angle between two adjacent second axes of symmetry is 45°.

9. The optical film according to claim 7, wherein an included angle θ between adjacent first axis of symmetry and second axis of symmetry is in a range of 0°<θ<45°.

10. The optical film according to claim 7, wherein a first spacing exists between adjacent light-condensing protrusions, and a second spacing exists between adjacent pixel units; and
- the first spacing is less than the second spacing, an absolute value of a difference between a multiple of the first spacing and the second spacing is greater than or equal to a first preset threshold, and the first preset threshold is a positive number.

11. The optical film according to claim 7, further comprising a light-shielding layer, wherein the light-shielding layer is provided with a plurality of light-transmitting holes, the light-shielding layer is arranged on the first surface of the base body facing away from the display module, the plurality of light-condensing protrusions are located on a second surface of the base body facing the display module, and the plurality of light-transmitting holes and the plurality of light-condensing protrusions are distributed in a one-to-one correspondence;
- an area of each of the light-transmitting holes is a first area, a spacing between two adjacent light-transmitting holes is a third spacing, an area of each of the pixel units is a second area, a spacing between two adjacent pixel units is a fourth spacing, the first area is less than the second area, and the third spacing is less than the fourth spacing; and
- the second area is not a multiple of the first area, and/or the fourth spacing is not a multiple of the third spacing.

12. The optical film according to claim 1, wherein an arrangement direction of the plurality of light-condensing protrusions is parallel to the first direction, and light passing through the light-condensing protrusions is polarized in the first direction to propagate in a direction of the optical axis of the base body.

13. An optical module, comprising a photosensitive unit and the optical film according to claim 1, wherein the optical film covers a photosensitive surface of the photosensitive unit.

14. The optical module according to claim 1, wherein the first arrangement direction is perpendicular to the second arrangement direction.

15. The optical module according to claim 1, wherein a second surface of the base body is provided with a light-shielding layer, the light-shielding layer is provided with a plurality of collimating holes, and each of the light-condensing protrusions corresponds to one of the collimating holes; and
- in the first arrangement direction, a line of centers between adjacent light-condensing protrusions is a first line of centers, and the first line of centers is an axis of symmetry of the light-condensing protrusions and the collimating holes.

16. The optical module according to claim 15, wherein a projection of the light-condensing protrusion is a regular hexagon in a vertical direction of the base body.

17. The optical module according to claim 15, wherein in the second arrangement direction, a line of centers between adjacent light-condensing protrusions is a second line of centers, and the second line of centers is an axis of symmetry of the light-condensing protrusions and the collimating holes.

18. The optical module according to claim 15, wherein an area of the collimating hole is less than or equal to an area of the light-condensing protrusion, and the light-condensing protrusion completely covers the collimating hole.

19. The optical module according to claim 13, wherein the first array group has a plurality of first axes of symmetry;
- a display module of an electronic device covers the optical film, the display module has a plurality of pixel units, the pixel units are arranged in an array to form a second array group, and the second array group has a plurality of second axes of symmetry; and
- each of the first axes of symmetry coincides with none of the plurality of second axes of symmetry.

20. An electronic device, comprising a housing, a display module, and the optical module according to claim 13, wherein the housing and the display module define an accommodating cavity, and the optical module is located in the accommodating cavity and distributed opposite to the display module.

* * * * *